United States Patent [19]

Mollison et al.

[11] 4,311,816

[45] Jan. 19, 1982

[54] PROCESS FOR THE PREPARATION OF POLYMERS OF α-OLEFINS

[75] Inventors: Alistair N. Mollison; Vaclay G. Zboril, both of Kingston, Canada

[73] Assignee: E. I. Du Pont de Nemours and Company, Wilmington, Del.

[21] Appl. No.: 147,055

[22] Filed: May 5, 1980

Related U.S. Application Data

[63] Continuation of Ser. No. 37,522, May 9, 1979, abandoned, which is a continuation-in-part of Ser. No. 900,298, May 19, 1978, abandoned.

[30] Foreign Application Priority Data

Apr. 27, 1977 [GB] United Kingdom ............... 17601/77

[51] Int. Cl.[3] .......................... C08F 4/66; C08F 10/02
[52] U.S. Cl. ................................ 526/116; 252/429 C; 252/431 R; 526/64; 526/151; 526/348.6; 526/352
[58] Field of Search ...................... 252/429 C, 431 R; 526/116, 151

[56] References Cited

U.S. PATENT DOCUMENTS 3,218,266  11/1965  Ludlum .............................. 526/116

FOREIGN PATENT DOCUMENTS 1235062   6/1971  United Kingdom ................ 526/151
1251177  10/1971  United Kingdom ................ 526/151

*Primary Examiner*—Edward J. Smith

[57] ABSTRACT

A solution polymerization process for the preparation of homopolymers of ethylene and copolymers of ethylene and higher α-olefins and a coordination catalyst for such a process are disclosed. In the process monomer is polymerized in the presence of the coordination catalyst which consists of a particular admixture of (a) a solution of an organoaluminum compound and an organomagnesium compound, with (b) a solution of a titanium compound and a vanadium compound. The catalyst exhibits relatively high activity in the polymerization of the monomers.

20 Claims, No Drawings

PROCESS FOR THE PREPARATION OF POLYMERS OF α-OLEFINS

This is a continuation, of application Ser. No. 037,522, filed May 9, 1979 which is a continuation-in-part of Ser. No. 900,298 filed May 19, 1978, both of said applications now abandoned.

BACKGROUND OF THE INVENTION

1. Field of the Invention

The present invention relates to a process for the preparation of polymers of α-olefins, especially homopolymers of ethylene and copolymers of ethylene and higher α-olefins, in which α-olefin monomer is polymerized in the presence of a four component coordination catalyst. In addition the present invention relates to a four component coordination catalyst for the polymerization of α-olefins.

2. Description of the Prior Art

Polymers of ethylene, for example, homopolymers of ethylene and copolymers of ethylene and higher α-olefins, are used in large volumes for a wide variety of end-uses, for example, in the form of film, fibers, moulded or thermoformed articles, pipe, coatings and the like.

Processes for the preparation of homopolymers of ethylene and of copolymers of ethylene and higher α-olefins are known. Such processes include processes in which the monomers are polymerized in the presence of a coordination catalyst, for example, a catalyst comprising a compound of a transition metal belonging to Groups IV-VIA of the Periodic Table and an organometallic compound of a metal belonging to Groups I–III of the Periodic Table.

A preferred process for the preparation of polymers and α-olefins is a so-called "solution" polymerization process, an example of which is described in Canadian Pat. No. 660,869 of A. W. Anderson, E. L. Fallwell and J. M. Bruce, which issued Apr. 9, 1963. A solution polymerization process is operated so that both monomer and polymer are maintained in solution in the reaction medium during polymerization of the monomer. In such a process relatively precise control of the degree of polymerization of the α-olefin monomer, and hence of the molecular weight of the polymer obtained, may be achieved by control of the reaction temperature. In an embodiment of a solution process, the molecular weight of the polymer may be further controlled by telomerization with hydrogen, as is described in Canadian Pat. No. 703,704 of C. T. Elston, which issued Feb. 9, 1965.

There are a number of advantages to a solution polymerization process, for example the ability to control the molecular weight of the polymer obtained, the ability to operate the process as a continuous process and to recover the polymer without the need for precipitation, the efficient use of catalyst and the properties of the polymer obtained.

A disadvantage of a solution polymerization process is that part of the catalyst remains in the polymer of ethylene. The catalyst remaining in the polymer, which may be referred to as "catalyst residue," may contribute to the colour of the polymer, to degradation of the polymer during subsequent processing of the polymer e.g. in extrusion, injection moulding and the like, and/or to degradation of the polymer on exposure of articles fabricated therefrom to ultra violet light. The amount of catalyst residue is related, at least in part, to the activity of the catalyst employed in the polymerization step of the process as the higher the activity of the catalyst the less catalyst that is, in general, required to effect polymerization at an acceptable rate. Catalysts of relatively high activity are therefore preferred in solution polymerization processes.

A solution polymerization process for the preparation of polymers of ethylene in which the catalyst is a coordination catalyst consisting of titanium tetrachloride, a vanadium compound and aluminum trialkyl is described in Canadian Pat. No. 635,823 of D. B. Ludlum, N. G. Merckling and L. H. Rombach, which issued Feb. 6, 1962. A polymerization process in which the catalyst is a coordination catalyst obtained by admixing (a) the hydrocarbon-insoluble solid reaction product of a hydrocarbon-soluble organoaluminum-magnesium complex and a titanium or vanadium compound containing halogen atom(s), and (b) an organoaluminum compound, is described in U.S. Pat. No. 4,004,071 of I. Aishima et al., which issued Jan. 18, 1977.

A solution polymerization process for the preparation of homopolymers of ethylene and copolymers of ethylene and higher α-olefins and a coordination catalyst for such a process have now been found. In the process, monomer is polymerized in the presence of the coordination catalyst which consists of a particular admixture of (a) a solution of an organoaluminum compound and an organomagnesium compound, with (b) a solution of a titanium compound and a vanadium compound.

SUMMARY OF THE INVENTION

Accordingly the present invention provides a solution polymerization process for the preparation of high molecular weight polymers of α-olefins selected from the group consisting of homopolymers of ethylene and copolymers of ethylene and higher α-olefins, said process comprising feeding α-olefin monomer, a coordination catalyst and inert hydrocarbon solvent to a reactor, and separating the polymer thus obtained, said coordination catalyst being an admixture of (A) a solution of an organoaluminum compound and an organomagnesium compound in inert hydrocarbon solvent, and (B) a solution of a titanium compound and a vanadium compound in inert hydrocarbon solvent, such that in the admixture (a) the atomic ratio of Al:Mg is in the range 0.1–20, (b) the atomic ratio of Ti:V is in the range of 0.3–20, (c) the atomic ratio of (Al+Mg):(Ti+V) is in the range 1.1–2.5 and (d) the sum of the expressions Al/(Al+Mg) and Ti/(Ti+V), on an atomic basis, is in the range of 0.7–1.7, said organoaluminum compound being selected from the group consisting of alkenyl aluminum, where the alkenyl group has 4–20 carbon atoms, $AlR_3$ and $AlR_2H$ where each R is alkyl, cycloalkyl or aryl-substituted alkyl of 1–20 carbon atoms, said organomagnesium compound being $MgR_2$ where each R is as defined, said titanium compound being of the formula $TiX_n(OR')_{4-n}$ where X is chlorine or bromine, R' is alkyl or aryl-substituted alkyl having 1–20 carbon atoms and n is 0–4, and said vanadium compound being selected from the group consisting of $VX_m(OR')_{4-m}$ and $VOX_p(OR')_{3-p}$, where m is 0–4 and p is 0–3.

In a preferred embodiment of the process of the present invention, the organoaluminum compound is alkenyl aluminum, where the alkenyl group has 4–10 carbon atoms, or $AlR_3''$ where each $R''$ is alkyl of 2–10 carbon atoms, the organomagnesium compound is $MgR_2'''$ where each $R'''$ is alkyl of 2–8 carbon atoms or aryl-substituted alkyl of 7–14 carbon atoms, the titanium compound is $TiCl_4$ or $TiBr_4$ and the vanadium compound is $VCl_4$, $VBr_4$ or $VOCl_3$.

In another embodiment, the atomic ratio of Al-Mg is in the range 0.1–20, the atomic ratio of Ti:V is in the range of 0.5–6, the atomic ratio of (Al+Mg):(Ti+V) is in the range of 1.1–2.0, especially 1.3–1.8, and the sum of the expressions Al/(Al+Mg) and Ti/(Ti+V), on an atomic basis, is in the range of 0.8–1.4.

The present invention also provides a coordination catalyst for the polymerization of α-olefins, said catalyst consisting of an admixture of (A) a solution of an organoaluminum compound and an organomagnesium compound in an inert hydrocarbon solvent; and (B) a solution of a titanium compound and a vanadium compound in an inert hydrocarbon solvent, such that in the admixture (a) the atomic ratio of Al:Mg is in the range of 0.1–20, (b) the atomic ratio of Ti:V is in the range of 0.3–20, (c) the atomic ratio of (Al+Mg):(Ti+V) is in the range 1.1–2.5 and (d) the sum of the expressions Al/(Al+Mg) and Ti/(Ti+V), on an atomic basis, is in the range of 0.7–1.7, said organoaluminum compound being selected from the group consisting of alkenyl aluminum, where the alkenyl group has 4–20 carbon atoms, $AlR_3$ and $AlR_2H$ where each R is alkyl, cycloalkyl or aryl-substituted alkyl of 1–20 carbon atoms, said organomagnesium compound being $MgR_2$ where each R is as defined, said titanium compound being of the formula $TiX_n(OR')_{4-n}$ where X is chlorine or bromine, R' is alkyl or aryl-substituted alkyl having 1–20 carbon atoms and n is 0–4, and said vanadium compound being selected from the group consisting of $VX_m(OR')_{4-m}$ and $VOX_p(OR')_{3-p}$ where m is 0–4 and p is 0–3.

DETAILED DESCRIPTION OF THE INVENTION

The present invention is directed to a solution process for the preparation of high molecular weight polymers of α-olefins, such polymers being intended for fabrication into articles by extrusion, injection moulding, thermoforming, rotational moulding and the like. In particular the polymers of α-olefins are homopolymers of ethylene and copolymers of ethylene and higher α-olefins, especially such higher α-olefins having 3 to 10, preferably 4–8, carbon atoms e.g. butene-1, hexene-1 and octene-1. Such polymers are known.

In the process of the present invention, α-olefin monomer, a coordination catalyst and inert hydrocarbon solvent are fed to a polymerization reactor. The coordination catalyst is formed by admixing a solution of an organoaluminum compound and an organomagnesium compound in inert hydrocarbon solvent with a solution of a titanium compound and a vanadium compound in inert hydrocarbon solvent.

The organoaluminum compound may be alkenyl aluminum, where the alkenyl groups has 4–20 carbon atoms and preferably 4–10 carbon atoms. Alkenyl aluminum compounds are known and are described in, for example, Canadian Pat. No. 712,602 of J. M. Bruce and I. M. Robinson, which issued June 29, 1965. A particularly preferred organoaluminum compound is that frequently referred to as isoprenyl aluminum or aluminum triisoprenyl. Alternatively the organoaluminum compound may be $AlR_3$ or $AlR_2H$ where R is alkyl, cycloalkyl or aryl-substituted alkyl of 1–20 carbon atoms. In a preferred embodiment the organoaluminum compound is $AlR_3''$ where each R'' is alkyl of 2–10 carbon atoms, especially ethyl or butyl.

The organomagnesium compound is of the formula $MgR_2$, where each R is as defined above. Preferably the organomagnesium compound is $MgR_2'''$ where each R''' is alkyl of 2–8 carbon atoms, especially butyl, or aryl-substituted alkyl of 7–14 carbon atoms.

The titanium compound is of the formula $TiX_n(OR')_{4-n}$ where X is chlorine or bromine, preferably chlorine, R' is alkyl or aryl-substituted alkyl having 1–20 carbon atoms and n is 0–4. The preferred titanium compounds are $TiBr_4$ and especially $TiCl_4$.

The vanadium compound may be a compound of the formula $VX_m(OR')_{4-m}$ where X and R' are as defined above and m is a number in the range 0–4. In a preferred embodiment the vanadium compound is $VCl_4$ or $VBr_4$. Alternatively the vanadium compound may be a compound of the formula $VOX_p(OR')_{3-p}$ where X and R are as defined above and p is a number in the range 0–3. In a preferred embodiment the vanadium compound is $VOCl_3$.

In the solution of organoaluminum compound and organomagnesium compound, the organoaluminum compound and organomagnesium compound are in amounts such that the ratio, on an atomic basis, of Al to Mg is in the range 0.1–20 and preferably in the range of 0.15–3.0.

In the solution of titanium compound and vanadium compound, the titanium compound and vanadium compound are in amounts such that the ratio, on an atomic basis, of Ti to V is in the range of 0.3–20 and preferably in the range 0.5–6.

The concentration of the components of the two solutions may be varied over a wide range, the particular concentrations being primarily governed by practical considerations. The admixing of the two solutions is exothermic and the evolution of heat may be a factor in determining the upper concentration limits of the two admixtures. In general concentrations up to about 50%, on a weight basis, may however be used. The lower concentration limits are related to practical considerations, for example the amount of solvent required, the equipment being used, especially the capacities thereof and the like. Concentrations of metals of as low as about 5 ppm (atomic basis) may be used but higher concentrations, for example 30 ppm (atomic basis) and above are preferred.

The coordination catalyst is obtained by admixing the solution of organoaluminum compound and organomagnesium compound with the solution of titanium compound and vanadium compound, the solutions having the ratios of Al:Mg and Ti:V, respectively, disclosed above. The solutions are admixed so that in the coordination catalyst so formed particular ratios of the components of the catalyst are obtained, thereby facilitating the beneficial effects, as discussed and illustrated in greater detail hereinafter, of the coordination catalyst, and the use thereof, of the present invention. In particular the solutions should be admixed so that the ratio, on an atomic basis, of (Al+Mg):(Ti+V) is in the range of 1.1–2.5, preferably 1.1–2.0, and especially in the range 1.3–1.8. Moreover the amounts of the individual components of the solutions should be such that in the coordination catalyst formed on admixing the solutions the sum of the expressions Al/(Al+Mg) and Ti/(Ti+V), on an atomic basis, is in the range 0.7–1.7 and preferably in the range 0.8–1.4.

The coordination catalyst may be formed prior to feeding the catalyst to the polymerization reactor or the coordination catalyst may be formed in the polymerization reactor i.e., formed in situ. For example the two solutions may be fed separately to the reactor and admixed therein. Alternatively solutions of the individual components of the catalysts may be fed separately to the reactor in which case both the two solutions and the coordination catalyst are in effect formed in situ. It is however preferred that the solutions be admixed to form the coordination catalyst prior to feeding to the reactor. For example the solutions may be continuously admixed, preferably under mixing conditions, at about ambient temperature and the resultant coordination catalyst fed to the reactor. The time between admixing the solutions and feeding the resultant coordination catalyst to the reactor may be short, e.g. 5-10 seconds, provided adequate mixing is achieved. Inadequate mixing may result in a polymer of inconsistent properties, for example, variable average molecular weight or molecular weight distribution. Moreover it is preferable not to age the coordination catalyst for more than, for example, about five minutes as catalyst degradation i.e. a loss of activity, may occur on aging.

The solvent used in the preparation of the coordination catalyst is preferably the same as that fed to the reactor in the polymerization process. Such solvent is an inert hydrocarbon, in particular a hydrocarbon that is inert with respect to the coordination catalyst. Such solvents are known and include for example hexane, heptane, octane, cyclohexane, methylcyclohexane and hydrogenated naphtha.

The nature of the coordination catalyst formed is not understood. It is however believed to be soluble in the hydrocarbon solvent, in the sense that a metallic compound may be soluble in an organic solvent, and/or colloidal in nature.

The coordination catalyst described herein may be used in the process of the present invention for the wide range of temperature over which a solution polymerization process is normally operated. For example such temperatures may be in the range 100°-320° C. and especially in the range 105°-310° C. The pressures used in the process of the present invention are those known for solution polymerization processes, for example in the range of about 4-20 MPa.

In a process of the present invention α-olefin monomer is polymerized in the reactor in the presence of the catalyst. Pressure and temperature are controlled so that the polymer formed remains in solution. Small amounts of hydrogen, for example 0.1-100 parts per million by weight based on the reactor feed, may be added to the feed in order to improve control of the melt index and/or molecular weight distribution and thus aid in the production of a more uniform product, as is disclosed in the aforementioned Canadian Pat. No. 703,704. The catalyst is usually deactivated immediately after the polymer leaves the polymerization reactor.

After deactivation of the catalyst the polymer solution may be passed through a bed of activated alumina or bauxite which removes substantially all of the deactivated catalyst residues from the polymer solution. The solvent may then be flashed off from the polymer solution and the polymer obtained extruded into water and cut into pellets or other suitable comminuted shapes. Pigments, antioxidants and other additives may be added to the polymer, as is known.

As is exemplified hereinafter the four component coordination catalyst used in the process of the present invention exhibits high activity and in particular exhibits high activity when compared with coordination catalysts having only three of the four components of the four component coordination catalyst. Moreover such high activity is especially exhibited when the four component coordination catalyst is admixed in the particular proportions described herein, as is illustrated hereinafter.

The process of the present invention may be used to prepare homopolymers of ethylene and copolymers of ethylene and higher α-olefins having densities, as measured by the procedure of ASTM D-1505, in the range of for example about 0.900-0.970 g/cm$^3$ and especially 0.915-0.965 g/cm$^3$, the polymers of higher density being homopolymers. Such polymers may have a melt index, as measured by the procedure of ASTM D-1238, condition E, in the range of, for example, about 0.1-200, and especially in the range of about 0.2-100. The polymers may be manufactured with narrow or broad molecular weight distribution. For example the polymers may have a stress exponent, a measure of molecular weight distribution, in the range of about 1.3-2.5. Stress exponent is determined by measuring the throughput of a melt indexer at two stresses (2160 g and 6480 g loading) using the procedure of the ASTM melt index test method, and inserting the data obtained in the following formula:

$$\text{Stress exponent} = \frac{1}{0.477} \log \left( \frac{\text{wt. extruded with 6480 g wt.}}{\text{wt. extruded with 2160 g wt.}} \right)$$

Stress exponent values of less than about 1.40 indicate narrow molecular weight distribution while values above about 2.00 indicate broad molecular weight distribution.

The polymers produced by the process of the present invention are capable of being fabricated into a wide variety of articles, as is known for homopolymers of ethylene and copolymers of ethylene and higher α-olefins.

The present invention is illustrated by the following examples.

EXAMPLE I

In this example, and the examples that follow, the following procedure was used unless noted otherwise, α-Olefin monomer was polymerized in a continuous stirred reactor system. The reactor was a cylindrical pressure vessel having an internal length of 11.3 mm and a diameter of 88.9 mm, the total volume of the reactor being approximately 70 ml. The pressure vessel was fitted with a heating jacket, means to control the pressure and temperature, two feed lines at one end of the reactor and an outlet line at the other end. The solvent used in the examples was cyclohexane which had been treated with silica gel, purged with nitrogen and further treated with silica gel. All solutions fed to the reactor were at a temperature of approximately 150° C.

The coordination catalyst was prepared by admixing a solution of organometallic compounds, hereinafter referred to as cocatalyst solution, with a solution of transition metal compounds, hereinafter referred to as catalyst solution, using a "T" junction followed by a length of tubing connected to one feed line of the reactor. The time between admixing the solutions and feeding the admixture to the reactor was approximately 10 seconds. The solutions were admixed at 23° C.

The catalyst and the other components of the reaction mixture were separately fed to the polymerization reactor, the rates of feeding being constant during each run. The temperature in the reactor was maintained at a constant value during each run. The reactor pressure was maintained at 7.5 MPa.

A deactivator solution (1% by weight, of 2,4-pentanedione in isobutanol) was injected into the reaction mixture that passed through the outlet line of the reactor. The pressure of the deactivated reaction mixture was then decreased to 0.11 MPa and unreacted α-olefin monomer was stripped from the reaction mixture using nitrogen. The amount of monomer thus removed was monitored on a gas chromatograph.

The dispersion obtained on stripping the monomer from the deactivated reaction mixture was cooled to about 20° C., extracted with an aqueous solution of hydrochloric acid (1%) and diluted with an equal volume of 2-propanol. The polymer, which precipated, , was filtered from the solution, washed with 2-propanol and dried at about 20° C. in the dark.

The activity of the catalyst, Kp was determined using the following formula $$Kp = \frac{d\left(\frac{Q}{1-Q}\right) \times SV}{dc}$$

where the conversion Q is the fraction of α-olefin monomer converted to polymer, SV is the space velocity in the stirred reactor in min$^{-1}$ i.e. the total feed rate divided by reactor volume, and c is the concentration of the coordination catalyst in the reactor in mmol/l. Kp was determined by measuring Q at various concentrations of the coordination catalyst at a constant ratio of catalyst components.

In runs 1-10, details of which are given in TABLE I, ethylene was used as the sole α-olefin monomer. The reaction mixture was maintained at a temperature of 220° C. The concentration of the coordination catalyst was varied over the range 0.12 to 0.70 mmol/l i.e. approximately 8 to 45 ppm on an atomic basis.

EXAMPLE II

The procedure of Example I was repeated except that the α-olefin monomer was ethylene admixed with approximately 40% by weight of butene-1. The reaction mixture was maintained at a temperature of 180° C. The catalyst concentration was varied over the range 0.17 to 0.46 mmol/l i.e., approximately 11 to 30 ppm on an atomic basis.

Details of the runs, runs 11-16, are given in TABLE II.

EXAMPLE III

The procedure of Example I was repeated except that the so-called catalyst and co-catalyst solutions were admixed in the polymerization reactor. The co-catalyst solution was fed to the reactor with the α-olefin monomer (ethylene). The coordination catalyst used was that of Run 8 of Example 1 except that the ratio (Al+Mg):(Ti+V) was 1.51. The temperature of the reaction mixture was 220° C. and the space velocity was 0.351 min$^{-1}$. The activity of the catalyst, Kp, was found to be 24.6, slightly lower than that obtained (27.5) in Run 8. Thus admixing of the catalyst in the polymerization reactor gave an activity only slightly lower than when the catalyst was admixed prior to being fed to the reactor.

EXAMPLE IV

The procedure of Example I was repeated. The components of the coordination catalyst were TiCl$_4$, VOCl$_3$, isoprenyl aluminum and dibutyl magnesium in amounts such that, on an atomic basis, the ratio of Ti:V was 2.33, the ratio of Al:Mg was 0.48, the ratio of (Al+Mg):(Ti+V) was 1.51 and the sum of the expression Al/(Al+Mg) plus Ti/(Ti+V) was 1.03.

TABLE I

| Coordination Catalyst* | Run No. | | | | | | | | | |
|---|---|---|---|---|---|---|---|---|---|---|
| | 1 | 2 | 3 | 4 | 5 | 6 | 7 | 8 | 9 | 10 |
| Ti:V | 0.25 | 0.25 | 1.00 | 1.00 | 1.00 | inf** | inf. | 2.33 | 4.00 | 2.33 |
| Al:Mg | inf. | 4.26 | 0.16 | 1.00 | inf. | inf. | 0.16 | 0.48 | 0.32 | 0.45 |
| (Al + Mg):(Ti + V) | 1.50 | 1.64 | 1.34 | 1.53 | 1.56 | 1.31 | 1.56 | 1.59 | 1.66 | 1.30 |
| Al/Al + Mg plus Ti/Ti + V | 1.20 | 1.01 | 0.64 | 1.00 | 1.50 | 2.00 | 1.14 | 1.03 | 1.04 | 1.01 |
| Space Velocity (SV), min$^{-1}$ | 0.351 | 0.352 | 0.353 | 0.352 | 0.355 | 0.355 | 0.351 | 0.352 | 0.353 | 0.352 |
| Catalyst Activity (Kp) | 8.57 | 14.1 | 4.01 | 21.8 | 3.99 | 0.44 | 16.3 | 27.5 | 18.3 | 22.1 |

*atomic basis, catalyst components were TiCl$_4$, VOCl$_3$, dibutyl magnesium and an aluminum compound. The aluminum compound was isoprenyl aluminum in Runs 1, 5, 6 and 10. In the remaining runs the aluminum compound was an admixture of isoprenyl aluminum and triethyl aluminum, the amount of triethyl aluminum being approximately 16% of the amount of magnesium on an atomic basis.
**infinite i.e. one component only
NOTE: Runs 1, 3, 5, 6 and 7 are not of the present invention and are included for comparison.

TABLE II

| Run No. | 11 | 12 | 13 | 14 | 15 | 16 |
|---|---|---|---|---|---|---|
| Ti:V | 2.33 | 2.33 | 1.00 | 0.54 | 0.25 | 0.25 |
| Al:Mg | 0.48 | inf** | 1.00 | 2.70 | 9.00 | inf. |
| (Al + Mg):(Ti + V) | 1.60 | 1.50 | 1.42 | 1.30 | 1.46 | 1.60 |
| Al/Al + Mg plus Ti/Ti + V | 1.03 | 1.70 | 1.00 | 1.08 | 1.10 | 1.20 |
| Space Velocity (SV), min$^{-1}$ | 0.302 | 0.309 | 0.313 | 0.310 | 0.296 | 0.308 |
| Catalyst Activity (Kp) | 32 | 8.46 | 27 | 13.3 | 8.39 | 8.05 |

*atomic basis, catalyst components were TiCl$_4$, VOCl$_3$, isoprenyl aluminum, dibutyl magnesium
**infinite i.e. one component only
NOTE: Runs 12 and 16 are not of the present invention and are included for comparison.

The α-olefin monomers was ethylene and the free ethylene concentration was 0.50 wt. %. The space velocity was 0.340 min$^{-1}$ and the reaction temperature was 200° C.

The ethylene homopolymer obtained had a melt index of 6.44. When hydrogen was also fed to the reactor in an amount sufficient to provide a concentration of 2 ppm in the reactor, the melt index of the polymer obtained increased to 44.5, thereby showing telomerization with hydrogen.

EXAMPLE V

The procedure of Example I was repeated except that in runs 17-26 of this example the cocatalyst solution and the catalyst solution were admixed at 23° C. for approximately 6 seconds and then at 220° C. for approximately 4 seconds.

The components of the cocatalyst solution were isoprenyl aluminum and butyl ethyl magnesium in runs 17-20, triisobutyl aluminum and dibutylmagnesium in runs 21-24 and triisobutyl aluminum and butyl ethyl magnesium in runs 25-26. The components of the catalyst solution were TiCl$_4$ and VOCl$_3$ in all runs.

The concentration of the coordination catalyst was varied over the range 0.11 to 0.32 mmol/l i.e. approximately 7.2 to 20.9 ppm on an atomic basis.

Details of the runs and the results obtained are given in TABLE III.

TABLE III

| Coordination Catalyst | Run No. | | | | | | | | | |
|---|---|---|---|---|---|---|---|---|---|---|
| | 17 | 18 | 19 | 20 | 21 | 22 | 23 | 24 | 25 | 26 |
| Ti:V | 1.00 | 1.00 | 1.00 | 1.00 | 1.00 | 1.00 | 1.00 | 1.00 | 1.00 | 1.00 |
| Al:Mg | Inf.* | 1.22 | 1.86 | 0.82 | Inf. | 1.22 | 3.00 | 1.86 | 1.86 | 3.00 |
| (Al + Mg):(Ti + V) | 1.78 | 1.21 | 1.45 | 1.94 | 1.70 | 1.25 | 1.44 | 1.46 | 1.45 | 1.23 |
| Al/Al + Mg plus Ti/Ti + V | 1.50 | 1.05 | 1.15 | 0.95 | 1.50 | 1.05 | 1.25 | 1.15 | 1.15 | 1.25 |
| Space Velocity (SV), min$^{-1}$ | 0.352 | 0.353 | 0.353 | 0.352 | 0.352 | 0.352 | 0.353 | 0.352 | 0.353 | 0.352 |
| Catalyst Activity (Kp) | 12.9 | 18.9 | 16.9 | 12.0 | 28.3 | 28.3 | 31.0 | 30.9 | 16.1 | 41.6 |

*infinite i.e. one component only
NOTE: Runs 17 and 21 are not of the present invention and are included for comparison.

EXAMPLE VI

The procedure of Example V was repeated except that the components of the co-catalyst solution were tri-n-hexyl aluminum and butyl ethyl magnesium.

The results obtained were as follows:

TABLE IV

| Coordination Catalyst | Run No. | |
|---|---|---|
| | 27 | 28 |
| Ti:V | 1.00 | 1.00 |
| Al:Mg | Inf.* | 3.00 |
| (Al + Mg):(Ti + V) | 1.44 | 2.42 |
| Al/Al + Mg plus Ti/Ti + V | 1.50 | 1.25 |
| Space Velocity (SV), min$^{-1}$ | 0.341 | 0.351 |
| Catalyst Activity (Kp) | 16.0 | 20.0 |

*infinite i.e. one component only. Run 27 is not of the present invention and is included for comparison.

EXAMPLE VII

In this example, the continuous stirred reactor system of Example I was replaced with a tubular reactor having two stepped reductions in diameter along its length. The reactor had a length of 33.8 cm, an inlet diameter of 14.3 mm, an outlet diameter of 6.35 mm and a capacity of 30 ml. The reactor was fitted with a heating jacket, means to control the pressure and temperature, two feed lines at the inlet end that were adapted to pre-heat the reaction mixture to the reaction temperature and an outlet. The procedure generally described in Example I was followed in the runs of this example.

In the runs using the tubular reactor the activity of the catalyst, Kp, was determined using the following formula $$Kp = \frac{d[-\ln(1-Q)] \times SV}{dc}$$

where Q and SV are as defined before.

The components of the catalyst solution were TiCl$_4$ and VOCl$_3$ and those of the co-catalyst solution were isoprenyl aluminum and dibutyl magnesium.

The results obtained are given in TABLE V.

TABLE V

| Run No** | 29 | 30 | 31 | 32 | 33 | 34 | 35 | 36 |
|---|---|---|---|---|---|---|---|---|
| Temperature, °C. | 255 | 255 | 255 | 255 | 272 | 272 | 272 | 272 |
| Coordination Catalyst | | | | | | | | |
| Ti:V | 0.25 | 0.66 | 1.00 | 2.33 | 0.25 | 0.66 | 1.00 | 2.33 |
| Al:Mg | Inf.* | 3.00 | 1.22 | 0.45 | Inf.* | 3.00 | 1.22 | 0.45 |
| (Al + Mg):(Ti + V) | 1.43 | 1.29 | 1.28 | 1.21 | 1.39 | 1.46 | 1.26 | 1.18 |
| Al/Al + Mg plus Ti/Ti + V | 1.20 | 1.15 | 1.05 | 1.01 | 1.20 | 1.15 | 1.05 | 1.15 |
| Space Velocity (SV), min$^{-1}$ | 0.570 | 0.570 | 0.570 | 0.570 | 0.970 | 0.970 | 0.980 | 0.970 |
| Catalyst Activity (Kp) | 4.87 | 6.07 | 6.58 | 4.83 | 7.50 | 9.94 | 9.60 | 5.44 |

*infinite i.e. one component only.
**Runs 29 and 33 are not of the present invention and are included for comparison.

EXAMPLE VIII

Ethylene (17.3%) in cyclohexane solution was polymerized in a stirred autoclave fitted with a trimmer reactor, of the type described in Canadian Pat. No. 837

225 of C. T. Elston and J. M. Stewart, issued Mar. 17, 1970, in the presence of a coordination catalyst prepared from a catalyst solution of vanadium oxytrichloride and titanium tetrachloride and a cocatalyst solution of isoprenyl aluminum and dibutyl magnesium as cocatalyst. 30 ppm Hydrogen were also fed to the reactor. The catalyst was fed to the reactor at a temperature of 43° C. The outlet temperature of the reactor was 251° C. The ethylene conversion was 94%. The reaction was terminated using an organic acid deactivator and the polymer was subsequently separated from the cyclohexane.

The coordination catalyst used had the following characteristics: (a) Ti:V=2.33, (b) Al:Mg=0.45, (c) (Al+Mg):(Ti+V)=1.15, (d) Al/Al+Mg plus Ti/Ti+V=1.01 and (e) catalyst concentration=0.17 mmol/l. The space velocity was 0.690 min$^{-1}$.

The polymer obtained had a density of 0.960 g/cm$^3$; a melt index of 33.0 dg/min; a stress exponent of 1.23; a yield strength, as measured by the procedure of ASTM D-638, of 262 Kg/cm$^3$; and a tensile modulus of elasticity, as measured by the procedure of ASTM D-638, of 4530 Kg/cm$^3$. The polymer had excellent colour and was subsequently fabricated into articles, using an injection moulding process, in a satisfactory manner.

EXAMPLE IX

The procedure of Example VIII was repeated except that the ethylene (11.8%) in cyclohexane solution also contained butene-1 in an amount to give a ratio of butene-1/ethylene in the reactor of 2.20 on a weight basis. The catalyst was fed to the reactor at a temperature of 23° C. The outlet temperature of the reactor was 200° C. The ethylene conversion was 91%.

The coordination catalyst used was similar to that of Example VIII except that it had the following characteristics: (a) Ti:V=0.92, (b) Al:Mg=1.22, (c) (Al+Mg):(Ti+V)=1.45, (d) Al/Al+Mg plus Ti/Ti+V=1.03 and (e) the catalyst concentration was 0.11 mmol/l. The space velocity was 0.747 min$^{-1}$.

The polymer obtained had a density of 0.921 g/cm$^3$, a melt index of 1.30 dg/min and a stress exponent of 1.43. The polymer had excellent colour and was subsequently extruded into film, using a blown film process, in a satisfactory manner.

EXAMPLE X

The procedure of Example I or Example VII was repeated except that the components of the co-catalyst solution were triethyl aluminum and butyl ethyl magnesium. Ethylene was the sole α-olefin monomer.

The results obtained were as follows:

TABLE VI

| Run No.* | 37 | 38 | 39 | 40** |
|---|---|---|---|---|
| Temperature, °C. | 255 | 255 | 255 | 220 |
| Coordination Catalyst | | | | |
| Ti:V | 1.00 | 1.00 | 1.00 | 1.00 |
| Al:Mg | Inf.*** | 4.00 | 1.50 | 4.00 |
| (Al + Mg):(Ti + V) | 1.40 | 1.55 | 1.21 | 1.71 |
| Al/Al + Mg plus Ti/Ti + V | 1.50 | 1.30 | 1.10 | 1.30 |
| Space Velocity (SV), min$^{-1}$ | 0.840 | 0.840 | 0.847 | 0.362 |
| Catalyst Activity | | | | |

TABLE VI-continued

| Run No.* | 37 | 38 | 39 | 40** |
|---|---|---|---|---|
| (Kp) | 11.4 | 13.5 | 11.0 | 49.7 |

*Runs No. 37, 38 and 39 were run according to the procedure of Example VII. Run No. 40 was run according to the procedure of Example I.
**during the determination of Kp one experiment involved the use of ethylene at a (concentration)$^{-1}$ of 6.41. The melt index of the resultant ethylene homopolymer was measured and found to be 8.9.
***infinite i.e. one component only. Run 37 is not of the present invention and is included for comparison

EXAMPLE XI

The procedure of Example I was repeated except that the components of the co-catalyst were aluminum diethyl hydride and butyl ethyl magnesium. Ethylene was the sole α-olefin monomer.

The results obtained were as follows:

TABLE VII

| Run No. | 41 | 42 | 43 | 44 |
|---|---|---|---|---|
| Temperature, °C. | 220 | 220 | 220 | 220 |
| Coordination Catalyst | | | | |
| Ti:V | 1.0 | 1.0 | 1.0 | 1.0 |
| Al:Mg | Inf.* | 5.67 | 3.35 | 2.33 |
| (Al + Mg):(Ti + V) | 1.25 | 1.25 | 1.25 | 1.25 |
| Al/Al + Mg plus Ti/Ti + V | 1.50 | 1.35 | 1.27 | 1.20 |
| Space Velocity (SV), min$^{-1}$ | 0.357 | 0.357 | 0.357 | 0.357 |
| Catalyst Activity (Kp) | 24.8 | 33.7 | 38.6 | 30.8 |

*infinite i.e. one component only. Run 41 is not of the present invention and is included for comparison.

EXAMPLE XII

The procedure of Example I was repeated except that the components of the co-catalyst were triethyl aluminum and butyl ethyl magnesium. Ethylene was the sole α-olefin monomer.

The results obtained were as follows:

TABLE VIII

| Run No. | 45 | 46 | 47 | 48 |
|---|---|---|---|---|
| Temperature, °C. | 220 | 220 | 220 | 220 |
| Coordination Catalyst | | | | |
| Ti:V | 1.0 | 1.0 | 1.0 | 1.0 |
| Al:Mg | Inf.* | 9.0 | 4.0 | 2.33 |
| (Al + Mg):(Ti + V) | 1.66 | 1.44 | 1.46 | 1.39 |
| Al/Al + Mg plus Ti/Ti + V | 1.50 | 1.40 | 1.30 | 1.20 |
| Space Velocity (SV), min$^{-1}$ | 0.361 | 0.365 | 0.364 | 0.364 |
| Catalyst Activity (Kp) | 42.1 | 48.2 | 37.6 | 21.7 |

*infinite i.e. one component only. Run 45 is not of the present invention and is included for comparison.

The embodiments of the invention in which an exclusive property or privilege is claimed are defined as follows:

1. A solution polymerization process for the preparation of high molecular weight polymers of α-olefins selected from the group consisting of homopolymers of ethylene and copolymers of ethylene and higher α-olefins, said process comprising feeding α-olefin monomer, a coordination catalyst and inert hydrocarbon solvent to a reactor, and separating the polymer thus obtained, said coordination catalyst being an admixture of (A) a solution of an organoaluminum compound and an organo-magnesium compound in inert hydrocarbon solvent, and (B) a solution of a titanium compound and a vanadium compound in inert hydrocarbon solvent, such that in the admixture (a) the atomic ratio of Al:Mg is in the range 0.1-20, (b) the atomic ratio of Ti:V is in the range 0.5-6, (c) the atomic ratio of (Al+Mg):(Ti+V) is in the range 1.1-2.5 and (d) the sum of the expressions Al/(Al+Mg) and Ti/(Ti+V), on an atomic basis, is in the range 0.7-1.4, said organoaluminum compound being selected from the group consisting of alkenyl aluminum, where the alkenyl group has 4-20 carbon atoms, $AlR_3$ and $AlR_2H$ where each R is alkyl, cycloalkyl or aryl-substituted alkyl of 1-20 carbon atoms, said organomagnesium compound being $MgR_2$ where each R is as defined, said titanium compound being of the formula $TiX_n(OR')_{4-n}$ where X is chlorine or bromine, R' is alkyl or aryl-substituted alkyl having 1-20 carbon atoms and n is 0-4, and said vanadium compound being selected from the group consisting of $VX_m(OR')_{4-m}$ and $VOX_p(OR')_{3-p}$, where m is 0-4 and p is 0-3.

2. The process of claim 1 in which the higher α-olefin has 3-10 carbon atoms.

3. The process of claim 2 in which the titanium compound is selected from the group consisting of $TiCl_4$ and $TiBr_4$ and the vanadium compound is selected from the group consisting of $VCl_4$, $VBr_4$ and $VOCl_3$.

4. The process of claim 3 in which the organoaluminum compound is selected from the group consisting of alkenyl aluminum and $AlR_3''$, where the alkenyl group has 4-10 carbon atoms and each R'' is alkyl of 2-8 carbon atoms, and the organomagnesium compound is $MgR_2'''$ where each R''' is alkyl of 2-8 carbon atoms or aryl-substituted alkyl of 7-14 carbon atoms.

5. The process of claim 4 in which the titanium compound is $TiCl_4$, the vanadium compound is $VOCl_3$ and the organomagnesium compound is $MgR_2'''$ where each R''' is alkyl of 2-8 carbon atoms.

6. The process of claim 5 in which, on an atomic basis, the ratio of Al:Mg is in the range 0.1-20, the ratio of (Al+Mg):(Ti+V) is in the range 1.1-2.0 and the sum of the expressions Al/(Al+Mg) and Ti/(Ti+V) is in the range 0.8-1.4.

7. The process of claim 5 in which the organoaluminum compound is isoprenyl aluminum.

8. The process of claim 5 in which the higher α-olefin has 4-8 carbon atoms.

9. The process of claim 5 in which the coordination catalyst is admixed prior to being fed to the reactor.

10. The process of claim 5 in which the polymer thus obtained has a density in the range 0.910-0.970 g/cm³ and a melt index in the range 0.1-200.

11. The process of claim 10 in which the polymer thus obtained is an ethylene homopolymer.

12. The process of claim 10 in which the polymer thus obtained is a copolymer of ethylene and a higher α-olefin.

13. The process of claim 5 in which the hydrocarbon solvent is selected from the group consisting of hexane and cyclohexane.

14. A coordination catalyst for the polymerization of α-olefins, said catalyst consisting of an admixture of (A) a solution of an organoaluminum compound and an organomagnesium compound in an inert hydrocarbon solvent; and (B) a solution of a titanium compound and a vanadium compound in an inert hydrocarbon solvent, such that in the admixture (a) the atomic ratio of Al:Mg is in the range 0.1-20, (b) the atomic ratio of Ti:V is in the range 0.5-6, (c) the atomic ratio of (Al+Mg)-(Ti+V) is in the range 1.1-2.5 and (d) the sum of the expressions Al/(Al+Mg) and Ti/(Ti+V), on an atomic basis, is in the range 0.7-1.4 said organoaluminum compound being selected from the group consisting of alkenyl aluminum, where the alkenyl group has 4-20 carbon atoms, $AlR_3$ and $AlR_2H$ where each R is alkyl, cycloalkyl or aryl-substituted alkyl of 1-20 carbon atoms, said organomagnesium compound being $MgR_2$ where each R is as defined, said titanium compound being of the formula $TiX_n(OR')_{4-n}$ where X is chlorine or bromine, R' is alkyl or aryl-substituted alkyl having 1-20 carbon atoms and n is 0-4, and said vanadium compound being selected from the group consisting of $VX_m(OR')_{4-m}$ and $VOX_p(OR')_{3-p}$ where m is 0-4 and p is 0-3.

15. The catalyst of claim 14 in which the titanium compound is selected from the group consisting of $TiCl_4$ and $TiBr_4$ and the vanadium compound is selected from the group consisting of $VCl_4$, $VBr_4$ and $VOCl_3$.

16. The catalyst of claim 15 in which the organoaluminum compound is selected from the group consisting of alkenyl aluminum and $AlR_3''$, where the alkenyl group has 4-10 carbon atoms and each R'' is alkyl of 2-8 carbon atoms, and the organomagnesium compound is $MgR_2'''$ where each R''' is alkyl of 2-8 carbon atoms or aryl-substituted alkyl of 7-14 carbon atoms.

17. The catalyst of claim 16 in which the titanium compound is $TiCl_4$, the vanadium compound is $VOCl_3$ and the organomagnesium compound is $MgR_2'''$ where each R''' is alkyl of 2-8 carbon atoms.

18. The catalyst of claim 17 in which, on an atomic basis, the ratio of Al:Mg is in the range 0.1-20, the ratio of (Al+Mg):(Ti+V) is in the range 1.1-2.0 and the sum of the expressions Al/(Al+Mg) and Ti/(Ti+V) is in the range 0.8-1.4.

19. The catalyst of claim 17 in which the organoaluminum compound is isoprenyl aluminum.

20. The catalyst of claim 17 in which the hydrocarbon solvent is selected from the group consisting of hexane and cyclohexane.

* * * * *